United States Patent [19]

Tratner

[11] Patent Number: 4,909,537
[45] Date of Patent: Mar. 20, 1990

[54] UNIVERSAL VEHICLE FOR PEDALING OR THE LIKE

[76] Inventor: Alan A. Tratner, 841 Paseo Camarillo, #424, Camarillo, Calif. 93010

[21] Appl. No.: 319,531

[22] Filed: Mar. 6, 1989

[51] Int. Cl.$^4$ ............................................. B62K 15/00
[52] U.S. Cl. .................................... 280/278; 280/287; 403/100
[58] Field of Search ............... 280/260, 278, 287, 274, 280/39, 281.1, 638, 38; 403/100, 102

[56] References Cited

U.S. PATENT DOCUMENTS 4,447,068  5/1984  Brooks ................................. 280/260
4,460,192  7/1984  Takamiya et al. ................... 280/278

Primary Examiner—Charles A. Marmor
Assistant Examiner—Richard Camby
Attorney, Agent, or Firm—Allan M. Shapiro

[57] ABSTRACT

The vehicle has a chassis formed of a front strut and a seat strut which are attached together so as to be angularly adjustable about a horizontal axis. The seat strut telescopically carries a seat post with a seat thereon. The front strut telescopically carries a front post. Angularly adjustably mounted on the top of the front post is the steering head which rotatably carries the front fork. A wheel is mounted on the lower end of the front fork. A power strut is also mounted on the chassis axis. A telescopically mounted post extends from the power strut and rotatably carries a rear wheel thereon. In this way, complete adjustability is achieved. Pedals are mounted on the chassis axis and are connected to drive the rear wheel. A motor may be additionally or alternatively installed. In addition, different kinds of wheels and different numbers of wheels as well as skis and the like can alternatively be installed.

30 Claims, 4 Drawing Sheets

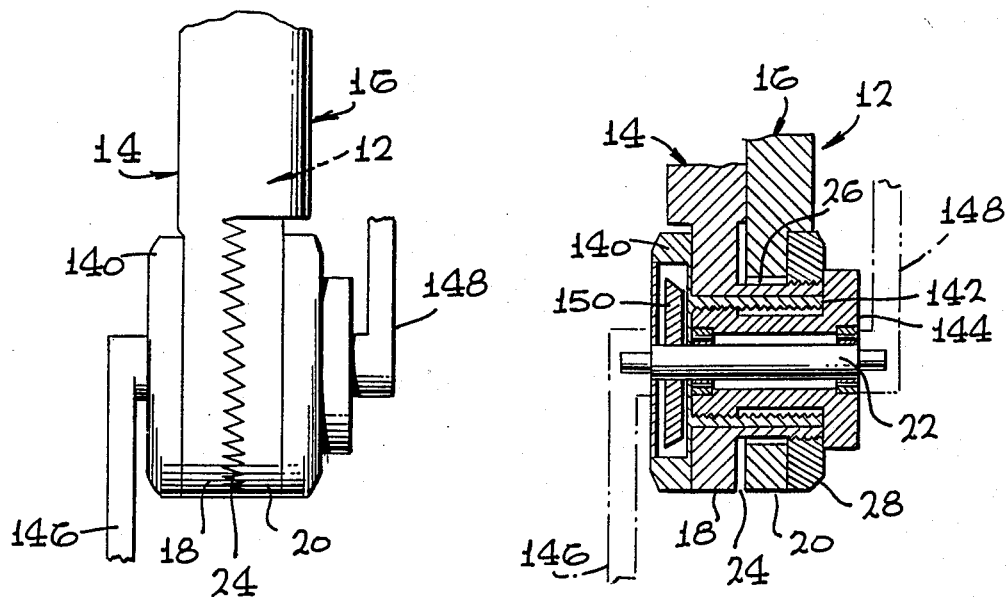
FIG. 2
FIG. 3
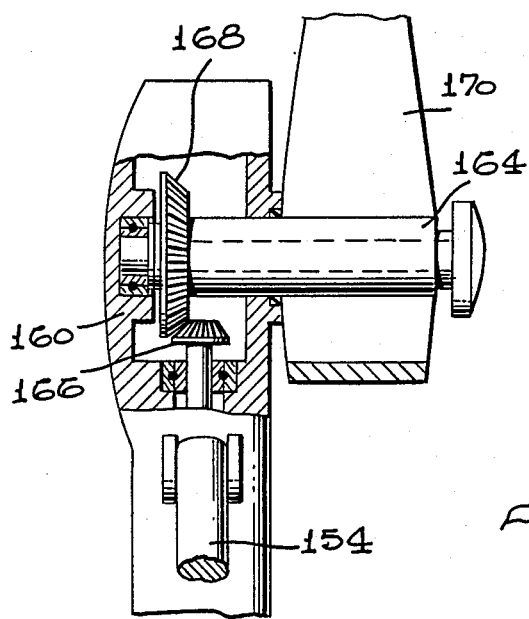
FIG. 8

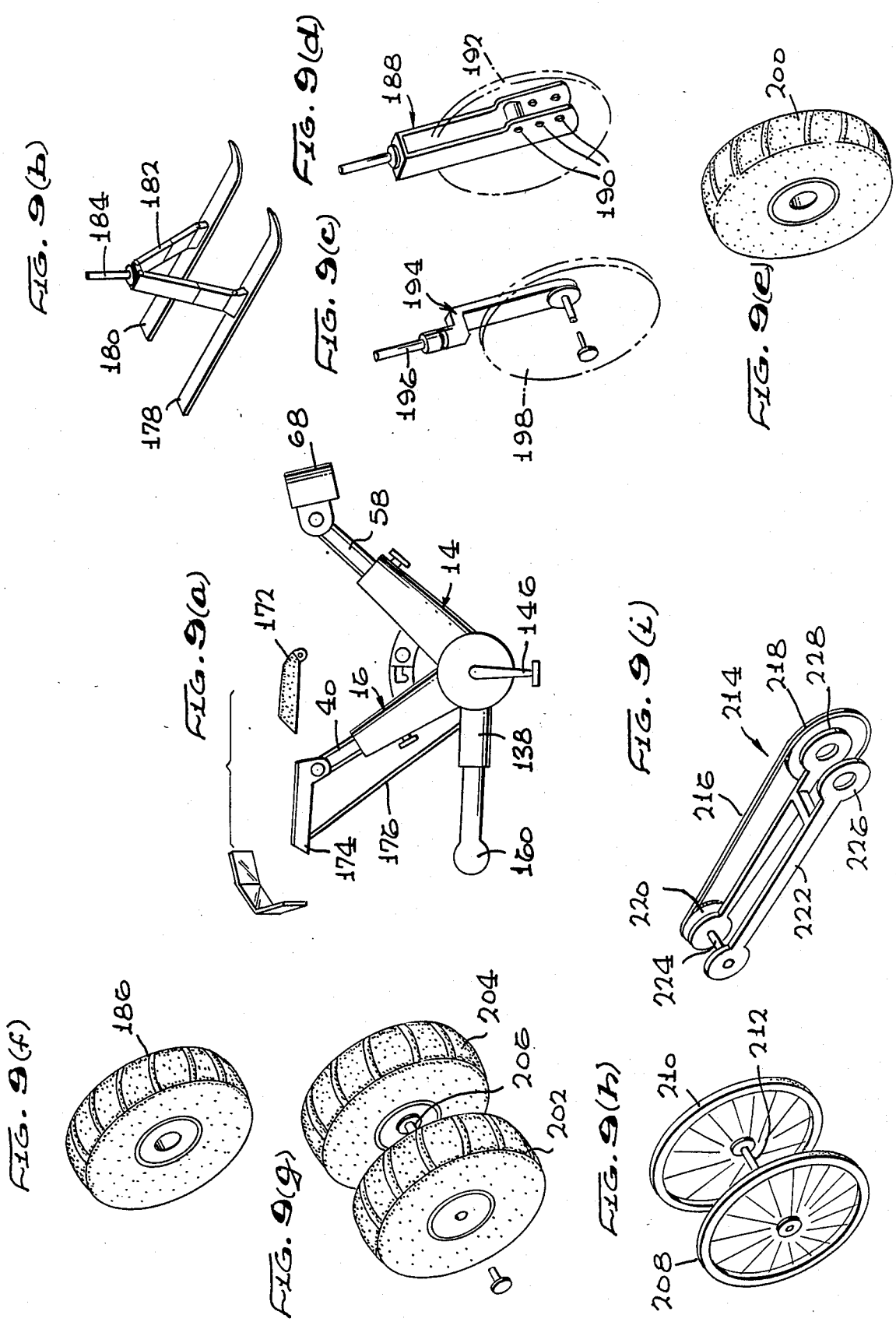

UNIVERSAL VEHICLE FOR PEDALING OR THE LIKE

FIELD OF THE INVENTION

This invention is directed to a personal vehicle for pedaling, which is a pedaled bicycle in the first preferred embodiment, with the chassis thereof being adjustable and the vehicle being capable of being fitted with various styles and number of wheels for various purposes.

BACKGROUND OF THE INVENTION

The bicycle is widely used in many countries foreign to the United States as a means of personal transportation. It is also widely used in the United States primarily by students and others who have only a short distance to travel. In recent years, the bicycle has developed into a fairly standard configuration. It has a rigid frame which is made as light as possible consistent with durability and cost of manufacture, for each particular style of riding. Creative design has been somewhat limited by the fact that the bicycle racing authorities do not permit innovative bicycles to be raced in sanctioned races. New materials have opened up new design opportunities, but until recently, there has been little significant change in bicycle design.

SUMMARY OF THE INVENTION

In order to aid in the understanding of this invention, it can be stated in essentially summary form that it is directed to a universal vehicle for pedaling or the like. The vehicle has a chassis comprised of a front strut and a seat strut. The front strut has a telescoping post which carries the front wheel while the seat strut has a telescoping seat post which carries the seat. These struts are adjustable with respect to each other, and the rear wheel is mounted to said chassis to aid in support of the chassis.

It is thus an object and advantage of this invention to provide a universal vehicle for pedaling or the like wherein the chassis is formed o a front strut and seat strut which are adjustable with respect to each other so as to achieve vehicle size adjustment, and the front wheel and seat are each angularly adjustable for comfort, handling and steering control in ride.

It is another object and advantage of this invention to provide a bicycle-like vehicle wherein front and rear wheels are adjustable for wheel base and front wheel camber and there are provisions for resilient mounting of both the front and rear wheels with respect to the chassis.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawing.

BRIEF DESCRIPTION OF THE DRAWINGS

FIG. 2 is a front view of the juncture between the front strut and seat strut, as seen generally along line 2—2 of FIG. 1, with parts broken away.

FIG. 3 is a section through the crank axis as seen generally along the line 3—3 of FIG. 1.

FIG. 8 is an enlarged plan view of the final drive as seen generally along the line 8—8 of FIG. 1, with parts broken away.

FIG. 9(a) is a side-elevational view of the chassis of a preferred embodiment of the vehicle of this invention, with some parts detached.

FIG. 9(b) is an isometric view of a pair of skis for selective attachment to the front of the chassis.

FIG. 9(c) is an isometric view of a single sided front fork for selective attachment to the front of the chassis.

FIG. 9(d) is an isometric view of a double fork for selective attachment to the front of the chassis.

FIG. 9(e) is an isometric view of a wheel for selective attachment to one of the front forks.

FIG. 9(f) is an isometric view of a single wheel, similar to the wheel of FIG. 9(e) for selective attachment to the rear of the chassis.

FIG. 9(g) is an isometric view of a pair of wheels for selective attachment to the rear of the chassis.

FIG. 9(h) is an isometric view of another pair of wheels for selective attachment to the chassis.

FIG. 9(i) is an isomeric view of a different power strut and final drive for the vehicle.

DESCRIPTION OF THE PREFERRED EMBODIMENTS

Figure 1:
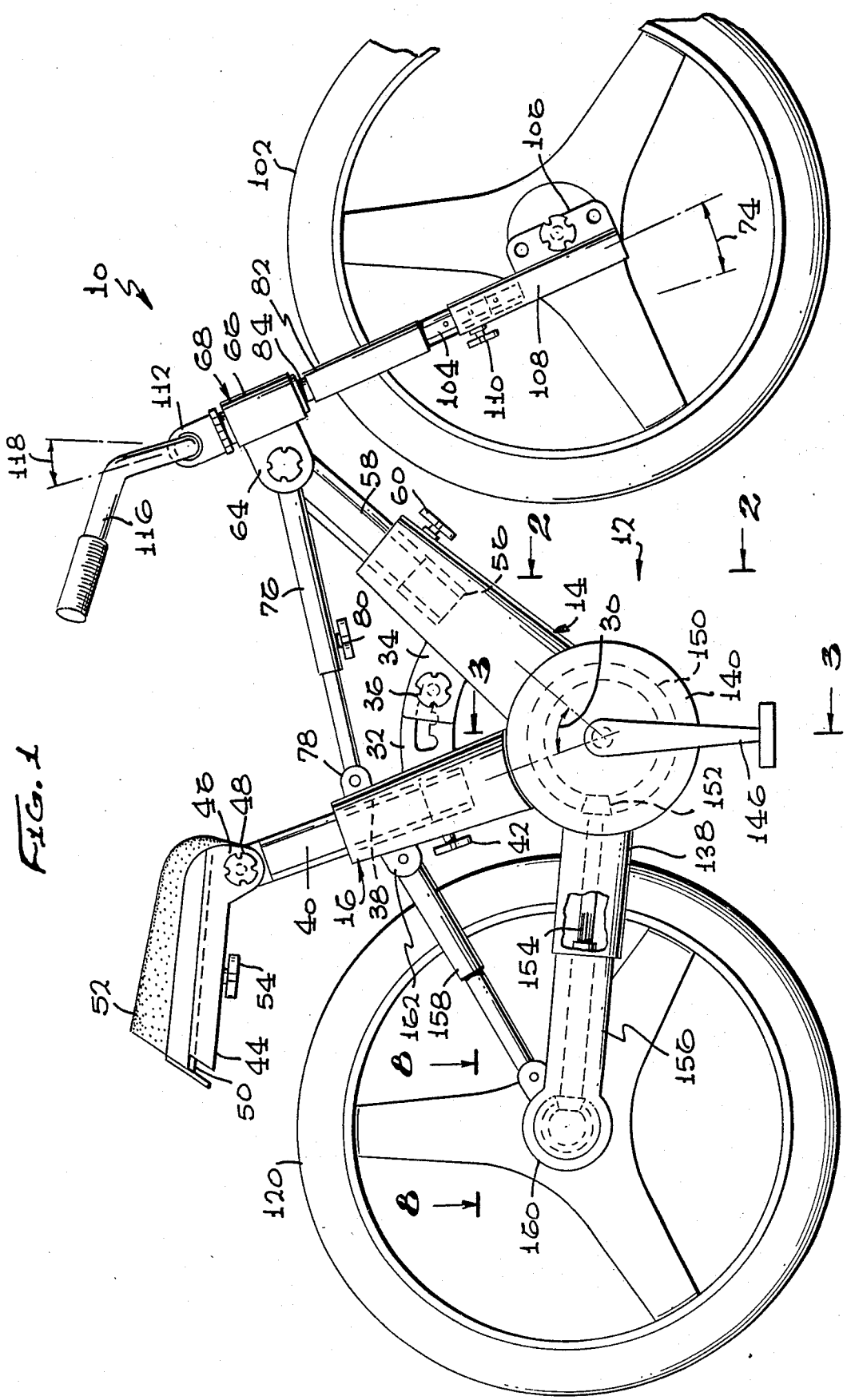
FIG. 1 is a side-elevational view, with parts broken away, of a preferred embodiment of the universal vehicle for pedaling or the like, in accordance with this invention.

The universal vehicle of this invention is generally indicated at 10 in FIG. 1. The central structural part of the vehicle 10 is the chassis 12 which is at the juncture of front strut 14 and seat strut 16. Considering the right end of FIG. 1 to be the front end of the vehicle 10, the front strut 14 is on the right side of the vehicle and the seat strut 16 is on the left side of the vehicle. In FIGS. 2 and 3, the view is rearward and shows flanges 18 and 20 respectively on the lower ends of the struts 14 and 16. The flanges are of circular configuration about the axis of crankshaft 22. The facing sides of the flanges have teeth 24. The teeth permit the two struts to be assembled in any desired angular orientation about the axis of crankshaft 22, and when the teeth are engaged, the relative angular position of the two struts is locked. While teeth are shown, any kind of equally spaced ridges and recesses or spline structure is useful. As is seen in FIG. 3, tube 26 is formed on flange 18 and extends thorough an opening in flange 20. A nut 28 engages on threads in the outer end of the tube 26 so that the flanges of at the two struts can be firmly tightened together in the desired orientation. Angle 30, shown in FIG. 1, shows the angle between the center line of the two struts and is the adjustment angle. In heavy-duty applications where this tooth engagement between the two struts may be considered insufficiently strong, arm 32 can extend forward from seat strut 16 and arm 34 can extend rearward from front strut 14, as seen in FIG. 1. These arms are in face-to-face contact and a clamp or bolt therethrough can be tightened by turning of clamp knob 36.

Socket 38, as shown in dashed lines in FIG. 1, is of uniform hexagonal cross section and slidably receives hexagonal seat post 40. Clamp knob 42 has a screw thereon which is threaded through the seat strut to clamp against the seat post to hold the seat post in the selected position of its telescopic adjustment. The top of seat post 40 has a flat on each side. Seat support 44 has a downwardly directed ear on each side, with a near one indicated at 46. A bolt therethrough with a clamp knob 48 thereon permits adjustment of he angle of the top of seat support 44. The top of the seat support has a keyway therein which is engaged by key 50 on the bottom of seat 52. This permits forward and rearward adjustment of the seat along the length of the keyway, together with clamping of the seat in position by means of clamp knob 54. The seat may be of any desirable cushion material.

Figure 5:
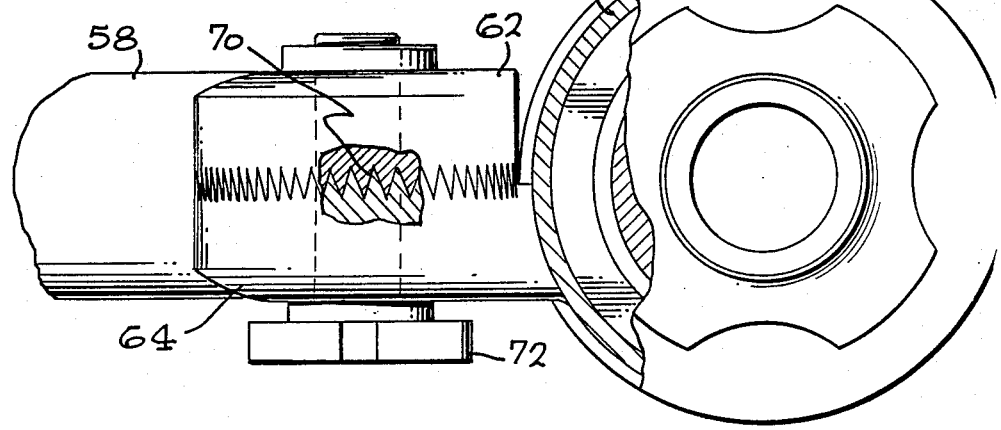
FIG. 5 is a plan view thereof, with parts broken away.

Front strut 14 has therein a similar socket 56, preferably of hexagonal or other non-round cross section. Front strut post 58 is of suitable configuration to fit within socket 56 and to slide therein in telescoping engagement. Clamp knob 60 clamps the post 58 at the selected extension from its strut. As is seen in FIGURE 5, the upper end of front strut post 5 has an ear 62 thereon which faces an ear 64. Ear 64 extends back from the collar 66 of steering head 68. The two ears 62 and 64 have interengaging teeth 70 so that they can be engaged with each other at a selected angle. Clamp knob 72 engages on a bolt extending through the two ears to tighten them together when they are in the selected angular position. Selected angular adjustment is indicated by angle 74 seen in FIG. 1. For those occasions when the vehicle 10 will be subjected to extraordinarily heavy duty, brace 76 can be employed to strengthen the angular relationship between the two struts. Brace 76 is attached on the forward end under the clamp bolt corresponding to the clamp knob 72 and on its rear end is attached to ear 78 on seat strut 16. Clamp knob 80 tightens the telescopic brace 76 at the selected position. Telescopic adjustment of this brace is necessary because of the telescopic adjustment of front strut post 58 and the angular adjustability between the two struts. The brace 76 may be used instead of or in addition to the arms 32 and 34.

Figure 4:
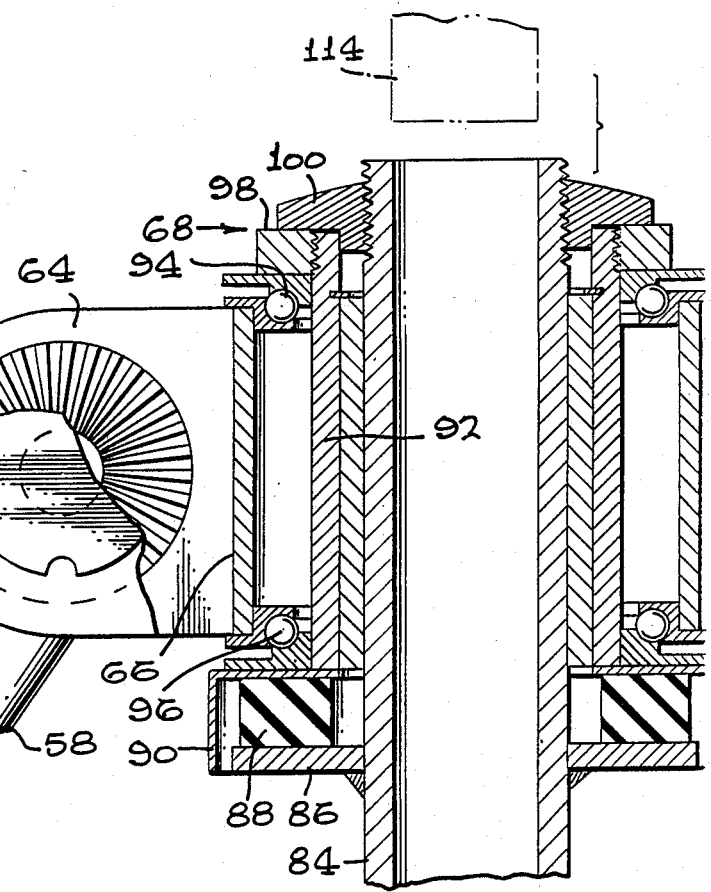
FIG. 4 is an enlarged center-line section through the steering head of the vehicle, with parts broken away.

Fork 82, seen in FIG. 1, has a fork stem 84, seen in more detail in FIG. 4. Flange 86 is secured on fork stem 84, as by welding, and rests against the bottom of annular resilient cushion 88. The cushion is protected by cup 90. The cup 90 rests against the bottom of steering tube 92 which is mounted upon angular ball bearings 94 and 96. Nut 98 engages on the steering tube and against the upper bearing to preload the bearings. Nut 100 engages on threads on the fork stem 84 to preload the cushion 88. In this way, stem 84 can rotate on the bearings on the axis of the stem and cushion 88 absorbs upward shocks of fork stem 84 with respect to collar 66 on the steering head.

In the embodiment shown in FIG. 1, fork 82 is a traditional bifurcated fork with a finger on each side of front wheel 102. Each finger of the bifurcated fork has a post thereon, preferably a hexagonal post, with the near post 104 shown in FIG. 1. Wheel mounting flange 106 is mounted on flange carrier 108, which has a socket therein which receives the fork post 104. The socket and the fork post are of non-round configuration, preferably hexagonal, so as to permit telescopic adjustment.

Clamp knob 110 locks the flange carrier in the selected position. The selected position has to do with the height of the steering head and the diameter of the front wheel. More coarse adjustment is achieved by the provision of three axle holes in flange 106 so that the wheel may be mounted thereon in any one of three selected positions.

Figure 6:
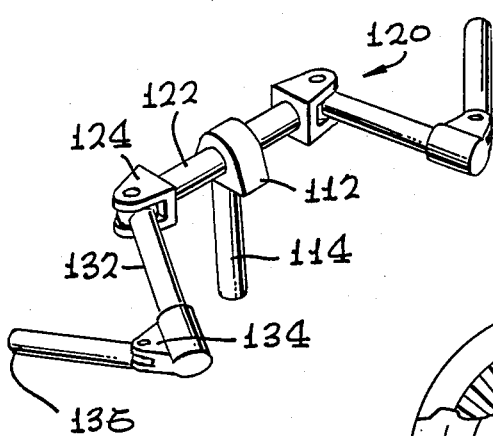
FIG. 6 is an isometric view of adjustable handlebars for use with the steering head.
Figure 7:
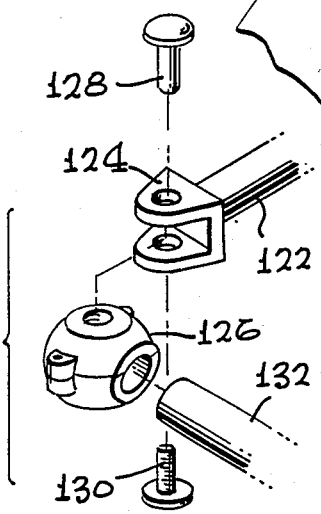
FIG. 7 is an enlarged isometric view showing one of the adjustment points of the handlebar of FIG. 6.

Handlebar clamp 112, see FIG. 1, has a spindle 114, see FIG. 4, which extends down into fork stem 84. It is clamped therein by means of a wedge which is drawn up into the spindle to spread the spindle, in conventional fashion. This securement permits adjustment of the handlebar clamp spindle up and down within the fork stem 84 for selecting the height of the handlebar clamp. Handlebar 116 is a conventional steer horn shaped handlebar of one-piece rigid construction. However, it is rotatable in handlebar clamp 112 to provide adjustment on the angle 118 seen in FIG. 1, and alternate handlebar 120 is shown in FIG. 6, with details thereof shown in FIG. 7. The handlebar 120 is fully adjustable with its center section 122 extending through and clamped within handlebar clamp 112. It is rotatable therein when the clamp is loose. Each end of the center section 122 carries a yoke thereon, with yoke 124 shown in more detail in FIG. 7. Yoke 124 is bifurcated and carries therein ball 126. Ball 126 has a hole therethrough which receives nut and bolt combination 128, 130, which also extends through openings in the yoke 124. In this way, the angle of the ball within the yoke can be adjusted and clamped. Arm 132 extends into a cross hole in the ball 226 and is clamped therein by tightening the ball thereon. Therefore, rotational adjustability of the arm within the ball is achieved. The outer end of arm 132 carries bifurcated yoke 134. Hand grip 136 is pivoted within yoke 134 and is clampable therein in the selected position. As is seen in FIG. 3, this structure is duplicated o both sides of the handlebar. By means of this structure, the hand grips can be placed at any selected height, width and angle for comfortable and effective grip. The adjustable structures of the struts and steering head can be protected from contamination by accordion bellow rubber sleeves, if desired, as shown in dashed lines in FIG. 1.

Rear drive arm 138, see FIG. 1, has a flange 140 which lies against the flange 18 of front strut 14, see FIGS. 2 and 3. As seen in FIG. 3, tube 142 extends all the way through a corresponding opening in tube 26 and is rotatable therearound. Plug 144 threads into the interior of tube 142 and engages against the right end of tube 142 to provide rotational freedom for tube 144. Bearings on the interior of plug 144 rotatably carry the crankshaft 22. Cranks 146 and 148 are fixed to the end of the crankshaft. The cranks have pedals thereon, as is seen in FIG. 1, in order to provide for engagement by the feet of the rider for turning the cranks and crankshaft about the axis of the crankshaft. As is seen in FIG. 3, bevel gear 150 is mounted in a pocket in flange 140. As seen in dashed lines in FIG. 1, bevel pinion 152 is in engagement with bevel gear 150 so that the bevel gear is rotated by rotation of the crank. Drive shaft 154 extends rearwardly. The drive shaft and rear drive arm 138 may be of one-piece construction, but when wheel base adjustment is desirable, they are made in two pieces, as shown in FIG. 1. Drive post 156 is telescopically engaged within a corresponding socket in drive arm 138. These parts are of non-round cross section, are preferably hexagonal, and are to prevent rotation. A clamp is provided to clamp the drive post 156 in the desired extension position with respect to drive arm 138. Since the flange 140 and its tube 142 are rotatable in the bottom of the chassis, suspension tube 158 provides support for the rear end of drive post 156. Suspension tube 158 is pivotally mounted on its rear end on gear box 160 on the rear end of drive post 156 and at its upper, forward end is pivotally mounted on an ear 162 formed on seat strut 16. Suspension tube 158 is telescopic and has spring characteristics in compression so that the gear box 160 is resiliently mounted with respect to the chassis. Suspension tube 158 may be a tubular shock absorber with a compression sprig therein or may contain a resilient rubber cushion which serves both the resilient spring and energy absorption functions.

As an alternate construction, the flange 140 can be locked tight against the chassis and up-and-down motion of the gear box 60 can be accommodated by flexure of the drive shaft and rear drive arm and drive post. In such a case, the drive arm ad drive post are preferably of one-piece construction so that flexure can be better controlled.

As seen in FIG. 8, gear box 160 supports rear wheel shaft 164 which is cantilevered out of the gear box. Suitable support bearings are provided in the gear box for the rotation of the rear wheel shaft with respect thereto and cantilever support thereof. Gear box 160 has a pocket therein which contains bevel pinion 166, which is mounted on the rear end of drive shaft 154, and has bevel gear 168 mounted on and fixed to rear wheel shaft 164 and in gear tooth engagement with bevel pinion 166. Thus, when the cranks are turned, rear wheel shaft 164 rotates. If desired, selectable ratio gearing can be provided in the gear box. A rear wheel brake is provided in the gear box, with the controls for the brake positioned conveniently to the rider. The size and shape of the gear box permit the use of a drum brake which provides reliable braking and long life. A drum brake is also conveniently provided at the mounting of the front wheel 102.

The complete adjustability of the vehicle 10 permits it to be adjusted for different size riders and for different purposes. While the vehicle is described as a pedal vehicle, it is clear that it can be equipped with a small engine. The major parts of the vehicle are preferably made of structural synthetic polymer composition material. The struts, posts, seat assembly, wheels and rear drive arm are particularly suited for construction of suitable synthetic material. Such construction can be light by virtue of employing tubular, yet strong and durable construction.

In addition to its preferred utilization as a two-wheeled pedal-powered vehicle, the basic adjustable chassis structure can be employed with other parts for other conveniences and other utilities. For example, in FIG. 9(a), the seat 172 is an extra long "banana" seat which is slidably mounted upon seat support 174. In view of the rearward extended length of the seat and seat support, seat bracket 176 is engaged between the seat support and rear drive arm 138 to additionally strengthen the seat.

As another example of the wide utility for the vehicle 10, as shown in FIG. 9(b), skis 178 and 180 are mounted upon yoke 182 which carries stem 184. The stem is the same as stem 84 and extends up into the steering head. When the vehicle is to be used on snow, of course a small rear wheel such as rear wheel 170 is unsuitable. To provide traction on the snow and prevent the wheel from digging too deep into the snow, a balloon rear wheel 186, as shown in FIG. 9(f) can be employed. Since the rear wheel shaft 164 is cantilevered, a thicker wheel and tire can be readily installed thereon.

The fork 82 is similar to the bifurcated fork 188 shown in FIG. 9(d). However, the fork 188 is a one-piece structure, that is without the fork length adjustability of the fork 82. The fork 188 achieves its adjustability by having three front wheel axle holes 190 so that the front wheel 192 may be mounted at different distances from the throat of the fork. This permits different height of the vehicle and permits the use of different sized front wheels.

The forks 82 and 188 are bifurcated forks, but the fork 194 shown in FIG. 9(d) has only one finger thereto. It is called a fork because it provides the same function as the traditional bicycle front forks. Fork 94 also has a fork stem 196 which is the equivalent to fork stem 84 and inserts into the same steering head. The advantage of a single-sided fork 194 is that wheels of different thicknesses can be employed. It is shown with front wheel 198, which is similar to wheel 92 and wheel 102, but a wider wheel such as wheel 200, shown in FIG. 9(e) can be employed. The wider wheel and tire are more suitable for soft ground and water. When the vehicle 10 is to be employed in soft ground and water, lateral stability may become a problem. Furthermore, for use of the vehicle in water, adequate flotation is required. Dual wheels 202 and 204 are shown in FIGURE 9(g). Dual wheels 202 and 204 are intended as rear wheels and can be mounted on the left side of gear box 160. The wheel 204 extends to the left (of the vehicle as mounted) and is supported by shaft 206. In this way, lateral stability and flotation are obtained so that the vehicle 10 can be employed in soft ground or on the water.

Lateral stability is not needed only in soft ground situations. There are other cases where the rider may be want lateral stability so that he can ride slowly and stop without getting off of the vehicle. In such a case, narrow traditional bicycle tires can be used. Dual wheels 208 and 210 are illustrated in FIGURE 9(h). The left wheel is supported by shaft 212. These dual wheels can be mounted on the left side of gear box 160, by being mounted on shaft 164 and extend to the left of the vehicle. A shaft drive is convenient because it is enclosed. However, a chain drive can alternatively be employed. FIG. 9(i) shows chain drive 214 where chain 216 is engaged around both front sprocket 218 and rear sprocket 220. The chain is held tight by means of rear wheel fork 222 which embraces the rear wheel mounted on rear wheel shaft 224. The flanges 226 and 228 respectively engage under flange 140 and the cap flange on plug 144 to hold the rear wheel fork in place. The chain may be positioned on either the right or left side of the vehicle, depending on preference.

The universal vehicle 10 is particularly useful when employed with two wheels and is propelled by pedaling. Therefore, its principal utility is as a bicycle. However, as indicated, the chassis can be supported by three wheels to make it a tricycle, and these three wheels may be narrow wheels for hard surfaces or wide tires for soft surfaces, or even flotation tires for water. Adjustability of chassis angle, seat position and handlebar position permit the vehicle to be used for different purposes and by different persons. The various adjustments allow changes in wheel base, changes in weight distribution, and control of the height of the center of gravity. The ground clearance can also be adjusted. This is all achieved in a vehicle which can be fitted to adults and children of different sizes. Furthermore, vehicle suspension is provided for both the front and rear wheels.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

WHAT IS CLAIMED IS:

1. A universal vehicle comprising:
a chassis, said chassis being formed of a front strut and a seat strut, each of said struts being separate, and each having a flange thereon, said flanges being in face-to-face contact with each other and being angularly adjustable with respect to each other about an axis substantially normal to the face of said flanges, said front strut having a front strut socket there and said seat strut having a seat strut socket therein;
a front strut post telescopically slidable in said front strut socket, means engaged between said front strut and said front strut post to secure said front strut post with respect to said front strut at a selected position;
front wheel support means mounted on said front strut post;
a seat post telescopically slidable with respect to said seat strut in said seat strut socket, means interengaged between said seat strut and said seat post to secure said seat post in a selected position with respect to said seat strut;
a seat mounted on said seat post; and
rear wheel drive and support means mounted on said chassis for carrying a rear wheel for support of said chassis and means for rotating said rear wheel for propulsion of said chassis.

2. The vehicle of claim 1 wherein each of said sockets is of non-round cross section and each of said posts is of non-round cross section shaped to engage within its corresponding socket so that rotation of each post in its socket is inhibited.

3. The vehicle of claim 2 wherein said socket and said posts are of hexagonal cross section.

4. The vehicle of claim 1 wherein there is connecting means between said struts to aid in maintaining the selected angular relationship between said struts.

5. The vehicle of claim 1 wherein there is a brace between said seat strut and said front post to maintain said front heel support means in position with respect to said seat strut.

6. The vehicle of claim 1 wherein said rear wheel support and drive means is flexibly mounted with respect to said chassis and there is a suspension tube mounted between said rear wheel support and drive means and said seat strut so as to transfer vertical loads out of the rear wheel onto said chassis through said suspension tube to said seat strut.

7. The vehicle of claim 6 wherein said suspension tube contains both resilient means therein and energy absorbing means to provide resilient support for said chassis.

8. The vehicle of claim 1 wherein said chassis has a crankshaft rotatably mounted therein extending through said flanges of said seat struts, a bevel gear mounted on said crankshaft, a drive shaft engaged with said bevel gear, a rear wheel mounted on said rear wheel support means, said rear wheel being connected to be driven by said drive shaft so that rotation of said crankshaft rotates said rear wheel.

9. The vehicle of claim 8 wherein said support and drive means is flexibly mounted with respect to said chassis and there is suspension means interconnected between said rear wheel drive and support means and said seat strut to absorb vertical shocks and resiliently absorb load of said rear wheel onto said chassis.

10. The vehicle of claim 9 wherein said rear wheel drive and support means is telescopically adjustable to adjust the distance from said chassis to said rear wheel.

11. The vehicle of claim 1 wherein said front wheel support means includes a front wheel fork having a front wheel mounted thereon, said front wheel support being rotatably mounted in a steering head, said steering head being mounted on said front steering post.

12. The vehicle of claim 11 wherein said front steering post carries said steering head adjustably mounted thereon to adjust the angle with respect to vertical of the axis of rotation of said fork in said steering head.

13. The vehicle of claim 12 wherein said front wheel has an axle and there is adjustment means on said fork for selecting the distance of said front wheel axle from said steering head so as to accommodate wheels of different size.

14. The vehicle of claim 13 wherein said adjustment means comprises a flange on said fork with a plurality of axle holes in said flange so that the positioning of said axle in a selected axle hole controls the distance of said axle from said steering head.

15. The vehicle of claim 12 wherein said front fork has a flange with an axle hole in said flange and said front wheel has an axle therethrough engaged in said axle hole, said flange being adjustably mounted with respect to said fork to control the distance from said axle to said steering head.

16. The vehicle of claim 15 wherein the adjustment of said flange with respect to said fork comprises a telescopic adjustment together with a clamp knob to selectably lock said telescopic adjustment in selected position.

17. The vehicle of claim 1 wherein said means for supporting a front wheel comprises a fork having two arms, together with a front wheel positioned between said arms.

18. The vehicle of claim 1 wherein said means for supporting said front wheel comprises a fork having a single arm together with a front wheel rotatably mounted on one side of said single arm.

19. The vehicle of claim 1 wherein said front wheel support means has a rotatable spindle therein and has a pair of skis mounted on said spindle so that said vehicle is partially supported on a pair of skis.

20. A universal vehicle comprising:
a chassis, said chassis being formed of a front strut and a seat strut, each of said struts having a flange thereon, and each of said flanges having a face thereon, said faces facing each other, securing means interengaging between said struts to retain said struts in a selected angular position with respect to each other, a shaft rotatably mounted with respect to said struts oriented substantially normal to said faces of said flanges;
means for mounting a rear wheel with respect to said chassis;
a seat post adjustably mounted with respect to said seat strut, a seat adjustably mounted on said seat post;

a front post adjustably mounted with respect to said front strut;

a steering head mounted on said front post, said steering head having a spindle axis therethrough;

a front fork having a spindle, said spindle being rotatably mounted in said steering head on said spindle axis; and a front wheel mounted on said front fork so that said vehicle is carried by said front wheel and said means for mounting a rear wheel.

21. The vehicle of claim 20 wherein said steering head is adjustably mounted on said front post so that he camber angle of said front fork can be selected.

22. The vehicle of claim 20 wherein said front wheel has an axle and there is means for adjusting the distance between said axle and said spindle so that the distance between said steering head and the support surface for said front wheel can be adjusted.

23. The vehicle of claim 22 wherein said adjustment means comprises a telescopic front fork.

24. The vehicle of claim 22 wherein said front fork has a flange thereon and said flange has a plurality of axle holes therethrough so that said adjustment means comprises positioning said axle in a selected axle hole.

25. The vehicle of claim 20 wherein said spindle is slidably mounted in said steering head and there is a cushion engaged between said spindle and said steering head to absorb upward shocks along the axis of said spindle.

26. The vehicle of claim 25 wherein said cushion includes rubberlike material.

27. The vehicle of claim 20 wherein said seat post carries a seat support thereon, said seat support being adjustable on a horizontal axis with respect to said seat post, said seat and said seat support having an interengaging key and keyway thereon so that said seat can be adjustable on said seat support in a direction towards and away from said steering head.

28. The vehicle of claim 20 wherein said rear wheel mounting means comprises a rear drive arm extending rearward from said chassis and a gear box on said drive arm, said gear box having a cantilevered rear wheel shaft extending from one side thereof and a rear wheel mounted on said cantilevered rear wheel shaft so that said rear wheel may be mounted and demounted from the free end of said rear wheel shaft.

29. The vehicle of claim 28 wherein said rear drive arm is telescopically adjustable so that the distance between said shaft in said chassis and said rear wheel shaft is selectable.

30. The vehicle of claim 20 further including a handlebar clamp mounted on said fork spindle and a handlebar mounted in said handlebar clamp, said handlebar having a center section through said handlebar clamp and having a yoke on each end of said center section, first and second arms respectively mounted in said yokes on said center section, said first and second arms respectively carrying first and second hand grip yokes and first and second hand grips respectively mounted in said first and second hand grip yokes, each of said yokes being adjustable and tightenable so that said hand grips can be selectively positioned.

* * * * *